3,190,905
ORGANIC ISOCYANATES
Heinrich Morschel and Claus Skopalik, Leverkusen, Germany, assignors to Farbenfabriken Bayer Aktiengesellschaft, Leverkusen, Germany, a corporation of Germany
No Drawing. Filed Feb. 7, 1962, Ser. No. 171,589
Claims priority, application Germany, Feb. 20, 1961, F 33,246
5 Claims. (Cl. 260—453)

This invention relates to the preparation of organic isocyanates and, more particularly, to a method of preparing aliphatic monoisocyanates.

It has been heretofore known to produce isocyanates by the decomposition of trisubstituted ureas. By this technique, trisubstituted ureas comprising at most two aryl groups and two amide groups corresponding to two amines having different boiling points are split by heating. Also, one-carboxylic acid amide of imidazole can be decomposed into the isocyanate and amidazole. It is common to both of these reactions that equivalent quantities of isocyanate and amine are formed. These processes, while they are of academic interest, are not of great commercial importance for the reason that the products formed are highly reactive with each other, thus making it difficult to isolate one from the other.

It is, therefore, an object of this invention to provide an improved method of making organic isocyanates. It is another object of this invention to provide an improved method of making aliphatic monoisocyanates. It is still another object of this invention to provide an improved method of making aliphatic monoisocyanates isolated from other reaction products formed.

The foregoing objects and others, which will become apparent from the following description, are accomplished in accordance with this invention, generally speaking, by providing a method of preparing alkyl monoisocyanates by reacting an N,N'-dialkyl urea with an equivalent quantity of a dialkyl or diaryl ester of carbonic acid at a temperature at which the reaction products can be separated immediately upon being formed. In the reaction stated, two mols of an alkyl isocyanate and two mols of either an alcohol or phenol will be formed. It is essential that the reaction be conducted above the boiling point of at least one of the reactants and better above the boiling points of both the reactants which allows to separate the two reaction products continuously by fractional distillation, that is, the reaction temperature must be such that the reaction products are separated immediately upon being formed. This invention, therefore, relates to a process for the production of an isocyanate having the formula

R—NCO which comprises reacting at elevated temperatures equivalent quantities of a composition having the formula

with a composition having the formula

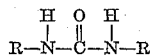

wherein R is an alkyl group having up to 4 carbon atoms and each X is selected from the group consisting of alkyl, cyclohexyl and aryl. After the reaction is substantially complete, the alkyl isocyanate having the formula as above-noted is separated from the reaction product by any suitable means such as by continuous fractionation.

In the process of this invention, to produce alkyl monoisocyanates, any suitable N,N'-dialkyl urea may be used where the alkyl radical may be any suitable alkyl radical such as, for example, methyl, ethyl, N-propyl, isopropyl, butyl, isobutyl, cyclohexyl, higher aliphatic radicals and the like. Further, a dialkyl urea having different alkyl radicals may be used to produce isocyanate mixtures such as, for example, a mixture of methyl isocyanate and ethyl isocyanate is formed from N-methyl-N'-ethyl urea and also a mixture of methyl isocyanate and phenyl isocyanate is formed from N-methyl-N'-phenyl urea.

Any suitable carbonic acid ester may be used in the reaction in accordance with this invention such as, for example, dialkyl carbonates, diaryl carbonates, alkyl aryl esters of carbonic acid and the like. Any suitable dialkyl carbonate may be used such as, for example, dimethyl carbonate, diethyl carbonate, dipropyl carbonate, diisopropyl carbonate, di-n-butyl carbonate, diisobutyl carbonate, dihexyl carbonate and the like. Any suitable diaryl carbonate may be used, such as, for example, diphenyl carbonate, di-α-naphthyl carbonate and the like. Any suitable alkyl aryl ester of carbonic acid may be used, such as, for example, methyl-phenyl carbonate, ethyl-phenyl carbonate, ethyl-α-naphthyl carbonate and the like. Since it is necessary to conduct this reaction at a temperature at which one of the reaction products will immediately distill off, this temperature being generally higher than 200° C., it is advisable to use as the carbonic acid ester those having boiling points higher than 200° C. at atmospheric pressure, such as, for example, di-n-butyl carbonate, ethylene carbonate, diphenyl carbonate, di-α-naphthyl carbonate and the like.

As stated previously, the reaction between the dialkyl urea and the carbonate is conducted at a temperature above the boiling point of at least one of the reaction products, thus insuring that the reaction products will be separated immediately upon being formed. The reactants are, however, generally added at a temperature above 200° C. If both the reaction products have a boiling point below the reaction temperature than to permit this separate isolation of the reaction products it is convenient to distill them as soon as they are formed over a column of such dimensions that the lower boiling product, that is usually the isocyanate, can be collected from the top of the column, while the higher boiling reaction product, that is usually the alcohol or phenol, is removed from the bottom of the column. Thus, the process of this invention provides a continuous method for preparing aliphatic isocyanates.

Aliphatic isocyanates are useful as intermediates, in the production of herbicides, fungicides and also in reaction with active hydrogen containing compounds to produce polyurethane plastic. They are also useful as components of adhesives to promote adhesion and as modifiers for plastics.

The invention is further illustrated by the following examples in which parts are by weight unless otherwise specified.

*Example 1*

About 130 parts of N,N'-dimethyl urea and about 318 parts of diphenyl carbonate are heated from about 200 to 250°. The methyl isocyanate forming in the reaction and having the boiling point 43–45° (142 parts) is drawn off at the top of a fitted column, while the phenol which forms (277 parts) is removed at the bottom of the column.

*Example 2*

174 parts of N,N'-diethyl urea and 321 parts of diphenyl carbonate are heated from about 205 to 225°. The ethyl isocyanate formed in the reaction and having a boiling point 60° (175 parts) is drawn off at the top of a fitted column, while the phenol which forms (237 parts) is removed at the bottom of the column.

*Example 3*

214 parts of diphenyl carbonate and 144 parts of N,N'-diisopropyl urea are heated to 225°. The isopropyl isocyanate formed in the reaction and having the boiling point 67° (93 parts) is drawn off at the top of a fitted column, while the phenol which forms (197 parts) is removed at the bottom of the column.

*Example 4*

84 parts of N,N'-di-n-butyl urea and 157 parts of dinaphthyl carbonate are heated from about 240 to 250°. The n-butyl isocyanate formed in the reaction and having the boiling point 107–112° is distilled off.

Although the invention has been described in considerable detail for the purpose of illustration, it is to be understood that variations can be made by those skilled in the art without departing from the spirit of the invention and scope of the claims.

What is claimed is:

1. A process for the production of aliphatic monoisocyanates which comprises reacting equivalent quantities of an N,N'-dialkyl urea and a carbonic acid ester at elevated temperatures and separating the reaction products immediately upon their formation.

2. A method of preparing aliphatic isocyanates which comprises reacting at elevated temperatures, an equivalent quantity of an N,N'-dialkyl urea and a carbonic acid ester selected from the group consisting of alkyl and aryl carbonic acid esters and separating the reaction products immediately upon the formation thereof.

3. A method for the production of alkyl isocyanates which comprises reacting equivalent quantities of an N,N'-dialkyl urea and a member selected from the group consisting of alkyl carbonic acid esters and aryl carbonic acid esters to produce an alkyl isocyanate and a member selected from the group consisting of alcohols and phenols, said reaction being conducted at a temperature above the boiling points of the reaction products and separating the reaction products by continuous fractional distillation as soon as they are formed.

4. A method for preparing methyl isocyanate which comprises reacting equivalent quantities of N,N'-dimethyl urea and diphenyl carbonate at a temperature above the boiling points of methyl isocyanate and phenol and separating the reaction products by distillation immediately upon being formed.

5. A process for the production of an isocyanate having the general formula:

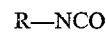

which comprises reacting at elevated temperatures equivalent quantities of a composition having the formula:

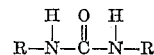

and a composition having the formula

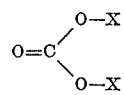

wherein R is an alkyl group having up to 4 carbon atoms and wherein each X is a radical selected from the group consisting of alkyl, cyclohexyl, phenyl and naphthyl, and separating the isocyanate formed thereby from the reaction mixture.

References Cited in the file of this patent

Siefken: Justus Liebigs Ann. der Chemie, vol. 562, pp. 76–83 (1949).

Moller: Chem. of Org. Compds., p. 308 (1957).